May 24, 1932.                D. REPONY                1,859,468
SPLICE AND METHOD OF SPLICING BELTS AND THE LIKE
Filed Sept. 25, 1931
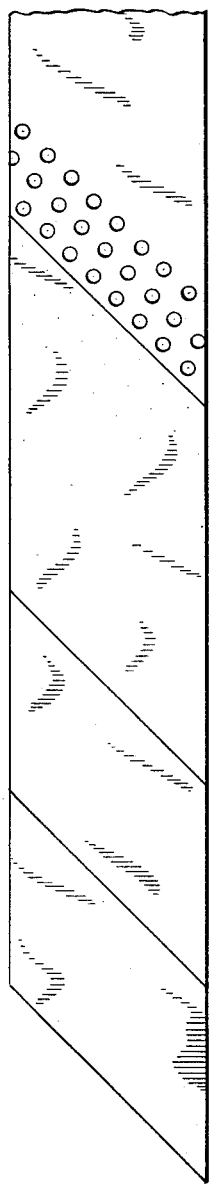
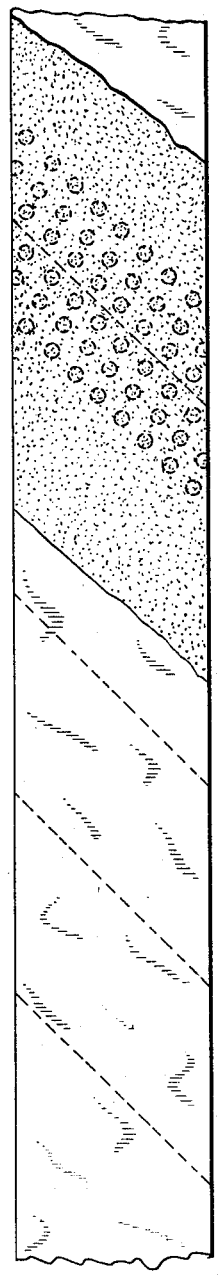
INVENTOR
DANIEL REPONY
BY HIS ATTORNEYS Patented May 24, 1932

1,859,468

UNITED STATES PATENT OFFICE

DANIEL REPONY, OF CLIFTON, NEW JERSEY, ASSIGNOR TO RAYBESTOS-MANHATTAN, INC., OF PASSAIC, NEW JERSEY, A CORPORATION OF NEW JERSEY

SPLICE AND METHOD OF SPLICING BELTS AND THE LIKE

Application filed September 25, 1931. Serial No. 565,149.

This invention relates to a splice and a method of splicing laminated textile fabric materials. More particularly the invention relates to a splice in which the abutting ends of the outer ply are so treated as to distribute over a substantial area of the spliced fabric the discontinuity of the stress transmitting parts of the fabric, and to lessen the rigidity of the outer ply adjacent the abutting edges in the plies.

In the splicing of belts, etc., where material after splicing is subjected to repeated flexing, and particularly where the spliced article is of substantial thickness, there is produced in the fabric, whenever the article is flexed, a strong compression strain on the outer ply at the inside curve, and a strong tension stress in the ply at the outside of the curve. With splices as made heretofore, this tension is resisted strongly by the fabric of the outer ply directly to the point at which the cut edges of the splice abut, and there a complete discontinuity occurs. I have found that it is largely as a result of this that the abutting edges are pulled apart upon flexure at the splice. Furthermore, if the ply is one of substantial stiffness, there is, upon flexing, a leverage effect which, I have found, tends to separate the edges at the splice and to tear them away from the other layers of the fabric.

Thus the greatest forces tending to failure of the splice result from the sharp discontinuity at the edge of the splice, particularly the discontinuity of the stress transmitting parts of the fabric and the discontinuity in the stiffness of the fabric.

I have now discovered that by so treating the ends of the ply which abut in the splice as to distribute over a substantial area such discontinuity, that a splice may be produced which is more permanent and will withstand long use under the most severe conditions. Paradoxical as this may seem, I have found that by weakening the ends of the ply adjacent the splice, the splice itself is strengthened.

This weakening or distributing may be effected in various ways, all of which are within the scope of my invention. I have found, however, that the most satisfactory, from a practical point of view, and the most adaptable to practical conditions, is merely to perforate or slit the material along lines adjacent the abutting ends of the ply and at points spaced on such lines and staggered relative to the stress transmitting parts of the fabric.

In the accompanying drawings I have shown a preferred form of splice made according to my invention as applied to a four-ply canvas belt.

Fig. 1 shows one end of such belt stripped ready for forming the splice;

Fig. 2 is a longitudinal section of a spliced belt;

Fig. 3 is a top plan view similar to Fig. 1, showing a belt after its ends are spliced together.

In this case the stress transmitting parts of the belt are the warp threads of the canvas, which run longitudinally of the belt. As will be seen from an examination of Fig. 1, the staggered perforations along the three diagonal lines result in severing all of the warp threads at some point back from the end of the ply. Thus, the excessive tension stress which results from flexing of the belt near the plies is terminated before the abutting end is reached, and there is little tendency to pull this end away from its normal position in the splice. Furthermore, these perforations serve to produce repeated lines of weakening along any of which the canvas of the ply may be flexed more easily than in the unperforated portion. Thus the leverage action of the ply which would otherwise tend to tear the edge away from its normal position in the splice whenever the belt is sharply flexed is substantially lessened.

In making a splice according to my invention, the plies are cut back and stripped so as to form a stepped end and preferably the plies are cut diagonally. The opposite end which is to be joined in the splice is cut back and stripped to form complementary steps. The upper ply of at least one end is preferably stripped back beyond the point at which it is cut, in order to perforate it. Obviously these perforations could be made without stripping this ply as just described, but in this case there would be danger of cutting also the ply beneath, which is ordinarily to be avoided.

The end of the opposite belt end which is to abut against the perforated end referred to above may then be perforated in the same manner, and the two complementary ends are then cemented and joined together, after which they will ordinarily be subjected to a press cure, or other treatment for vulcanizing, or otherwise setting the cement.

During the press curing, the cement which, in the case of belting, is ordinarily a gum rubber, may enter and fill the perforations and preferably flow out over the top of the splice, thereby securely anchoring the spliced ends to the rubber film, and thereby to the canvas ply beneath.

It will be observed by reference to Fig. 1 that a tension upon the outer ply is transmitted to the abutting edge of the splice only indirectly. Thus, the warp threads which are not interrupted by the first line of perforations carry this stress to the second line of perforations, where they also are interrupted. In the space between the first and second line, they transmit this stress to the filler threads, which in turn transmit it to the short portions of the warp threads interrupted by the first line of perforations. These in turn will be interrupted by the third line of perforations, and therefore must transmit the stress back through the filler threads to a second group of short warp threads. This transmission back and forth through the filler threads allows for a substantial extensibility in this perforated area of the ply, and thus the stress may be gradually absorbed by elongation of this portion without separating the abutting edges of the plies. The elastic extensibility in this area adjacent the end of the ply may be attained in other ways and to the extent that it is attained, the splice will fall within the scope of my invention.

Generally it is necessary only to perforate the outside ply, that is to say, the outer ply of the belt which is to form the outside of the curve when the belt is flexed. However, it may often be desirable to similarly treat both outer plies of the belt, particularly in the case where the belt is to pass over a series of pulleys, so that it would be flexed alternately in opposite directions, or where the belt is likely to be reversed before or during its use.

It is to be understood that in referring to cement I do not mean to imply that it is necessary in all cases to use an additional adhesive for the splice. For example, in the case where the belt is to be spliced during its original manufacture, the plies may be perforated and stepped back before the final vulcanization of the belt, and in this case the rubber which serves to hold the various plies of the belt together may also serve to hold the plies together in the splice. Ordinarily, however, it is desirable to add some additional rubber, at least to the perforated portions, so that the anchoring effect may be secured, i. e., so that the rubber may fill and overflow the perforations.

The number, size and spacing of the perforations may be widely varied, according to the conditions under which the belt is to be used, and instead of punching out holes, as shown in the drawings, the stress transmitting parts may be interrupted in other ways, as, for example, by merely forming a series of short slits. Or the canvas could be cut halfway through above a filler thread, so that one-half the warp threads would be cut, and along another filler thread spaced therefrom a similar cut would sever the other half of the warp threads. Numerous other ways may be adopted for the purpose of avoiding the abrupt termination of the stress transmission. It will be understood, furthermore, that this effect may be attained even without severing any of the stress transmitting parts of the fabric if they are so arranged as gradually to yield to the stress before the end of the ply is reached. Thus the filler threads could be omitted entirely from near the end of the ply, and the warp threads braided, or merely turned at an angle so as to yield to the tension and stress without pulling their ends away from the abutting line of the splice.

What I claim is:

1. A step splice in a laminated flexible material, an outer ply of which is of a material normally relatively inextensible, which comprises abutting ends stepped so that an end of one ply overlaps the joint of an adjacent ply, an area of an outer ply adjacent each of said abutting ends being made substantially more extensible by perforations in the material, and an elastic cement resiliently joining together the overlapping ends in said splice.

2. A step splice in a laminated flexible material, an outer ply of which is of a material normally relatively inextensible, which comprises abutting ends stepped so that an end of one ply overlaps the joint of an adjacent ply, an area of an outer ply adjacent each of said abutting ends being made substantially more extensible near its end than throughout the remainder of said layer, and an elastic cement resiliently joining together the overlapping ends in said splice.

3. A splice as defined in claim 2, in which both the outer layers are substantially more extensible adjacent to the splice than throughout the remainder of the belt.

4. A splice as defined in claim 1, in which the cement is anchored in the perforations.

5. A step splice in a laminated flexible material, an outer ply of which is of a material normally relatively inextensible, which comprises abutting ends stepped so that an end of one ply overlaps the joint of an adjacent ply, an area of an outer ply adjacent each of said abutting ends being made substantially more extensible by severing its stress transmitting parts along successive lines and at points staggered with relation to said stress transmitting parts, whereby direct transmission of stress to the abutting edges of said splice is substantially prevented.

6. A belt splice which comprises a strip of laminated, rubberized canvas having its warp running the length of the strip, the ends of the plies of said strip being progressively cut back at an oblique angle to form complementary stepped ends, the ends of an outer ply being perforated near the splice, the perforations being in staggered arrangement such that every warp thread is severed within a short distance from the end, and the complementary ends being cemented together by rubber vulcanized between the overlapping stepped portions.

7. A spliced laminated fabric belt in which at least the outer ply has its longitudinal threads cut so that the interruption in stress transmitting threads thereof is distributed over a substantial area and scattered from any single straight line.

8. The method of splicing a belt which comprises cutting back at least a portion of the plies thereof so as to produce a stepped end, perforating the outer ply near the end, cutting back the end which is to be spliced thereto so as to form complementary step portions, perforating the same outer ply of said complementary end and cementing the overlapping complementary ends together.

9. The method of splicing a belt which comprises cutting back at least a portion of the plies thereof on both of the ends which are to be spliced, so as to form complementary stepped ends, treating the ends of the outer ply over a substantial area adjacent the splice to render them more flexible and extensible than the remainder of said ply, and fitting together and cementing the complementary stepped ends.

10. The method as defined in claim 9, in which the treatment to render the ends of the outer ply more flexible and extensible consists in perforating said ply at staggered points within areas adjacent the respective ends of said outer ply.

11. The method as defined in claim 9, in which the treatment to render the ends of the outer ply more flexible and extensible comprises cutting, within the areas adjacent the ends of said ply which are to be joined, all of the stress transmitting threads of the fabric of which said ply is made, but at staggered points, so that nowhere within said areas is the ply completely severed.

Signed at Passaic, New Jersey, this 15 day of September, 1931.

DANIEL REPONY.